Sept. 24, 1940.    A. W. GRAY    2,215,921
STOP AND TURN SIGNAL
Filed May 10, 1939    3 Sheets-Sheet 1

Inventor
A. W. GRAY,

By Clarence AO'Brien
and Hyman Berman
Attorneys

Sept. 24, 1940.  A. W. GRAY  2,215,921
STOP AND TURN SIGNAL
Filed May 10, 1939  3 Sheets-Sheet 2
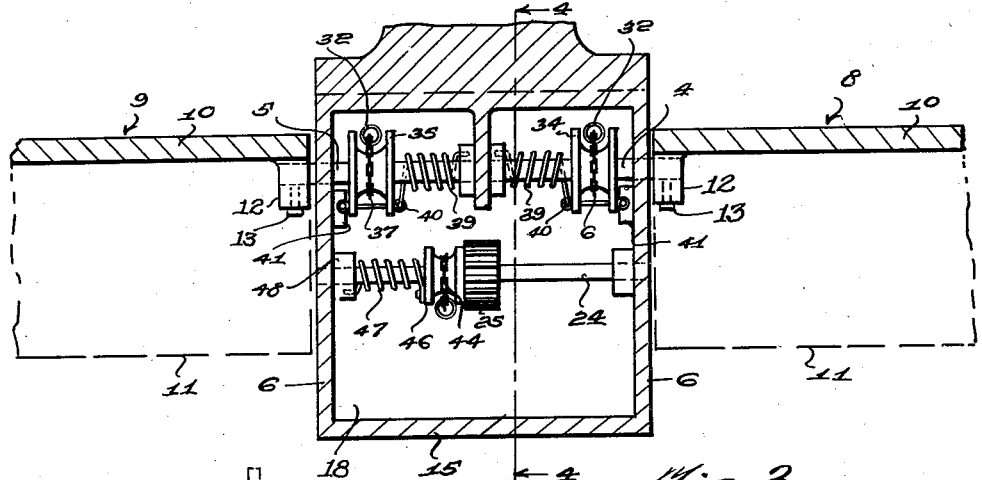
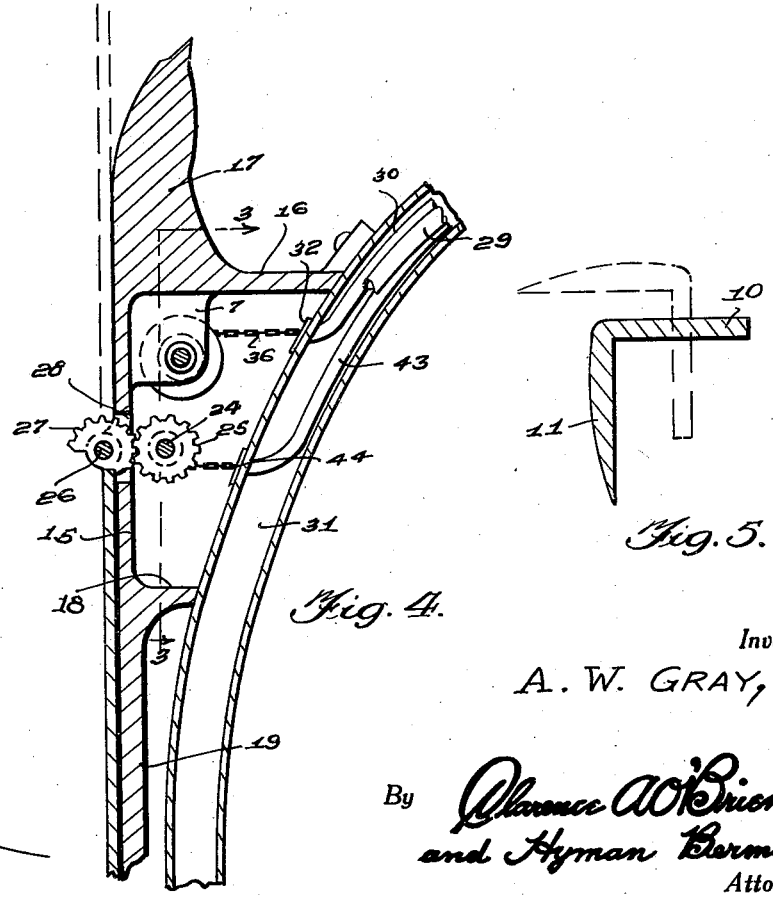
Inventor
A. W. GRAY,
By Clarence A. O'Brien
and Hyman Berman
Attorneys Sept. 24, 1940.   A. W. GRAY   2,215,921

STOP AND TURN SIGNAL

Filed May 10, 1939   3 Sheets-Sheet 3

Inventor

A. W. GRAY,

By Clarence A. O'Brien
and Hyman Berman
Attorneys

Patented Sept. 24, 1940

2,215,921

UNITED STATES PATENT OFFICE 2,215,921

STOP AND TURN SIGNAL

Arthur W. Gray, Pueblo, Colo.

Application May 10, 1939, Serial No. 272,924

2 Claims. (Cl. 116—46)

My invention relates to improvements in combination stop and turn signals for motor vehicles.

The invention is designed with the particular purpose in view of providing a simply constructed signaling apparatus which may be readily attached to the rear end of the body of an automobile for manual operation from the driver's seat to indicate the intention of the driver to stop, or to turn, right or left, and including signaling means adapted to be normally blinded, or covered, in a manner such as to direct attention to an automobile equipped with the signaling apparatus.

My invention also comprehends other and subordinate objects, all of which, together with the precise nature of my improvement, will be readily understood when the succeeding description and claims are read with reference to the drawings accompanying and forming part of this specification.

In the drawings:

Figure 3 is a fragmentary view in transverse section taken through the control box and right and left turn signaling members.

Figure 4 is a view in vertical central section taken on the line 4—4 of Figure 3 looking in the direction indicated by the arrows.

Figure 5 is a detail view in transverse section taken on the line 5—5 of Figure 2 looking in the direction indicated by the arrows.

Figure 1:
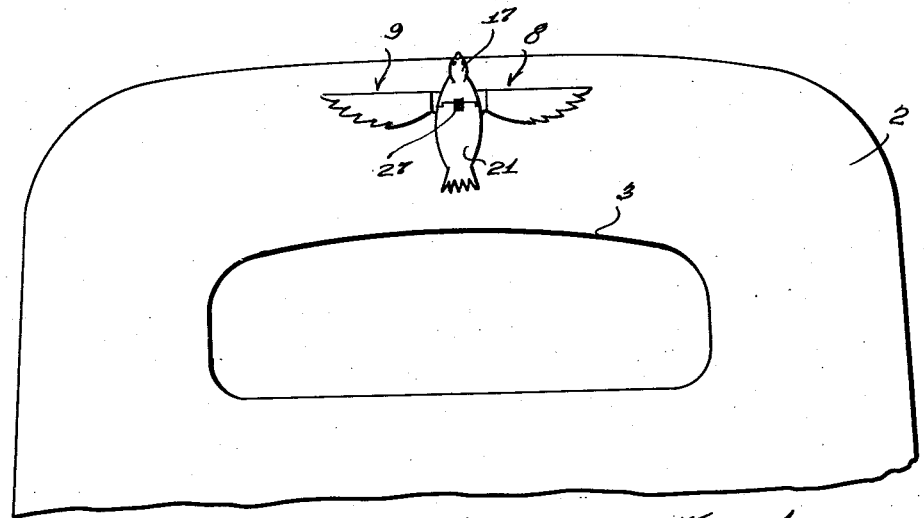
Figure 1 is a fragmentary view in rear elevation of the body of an automobile equipped with my improved signaling apparatus.
Figure 2:
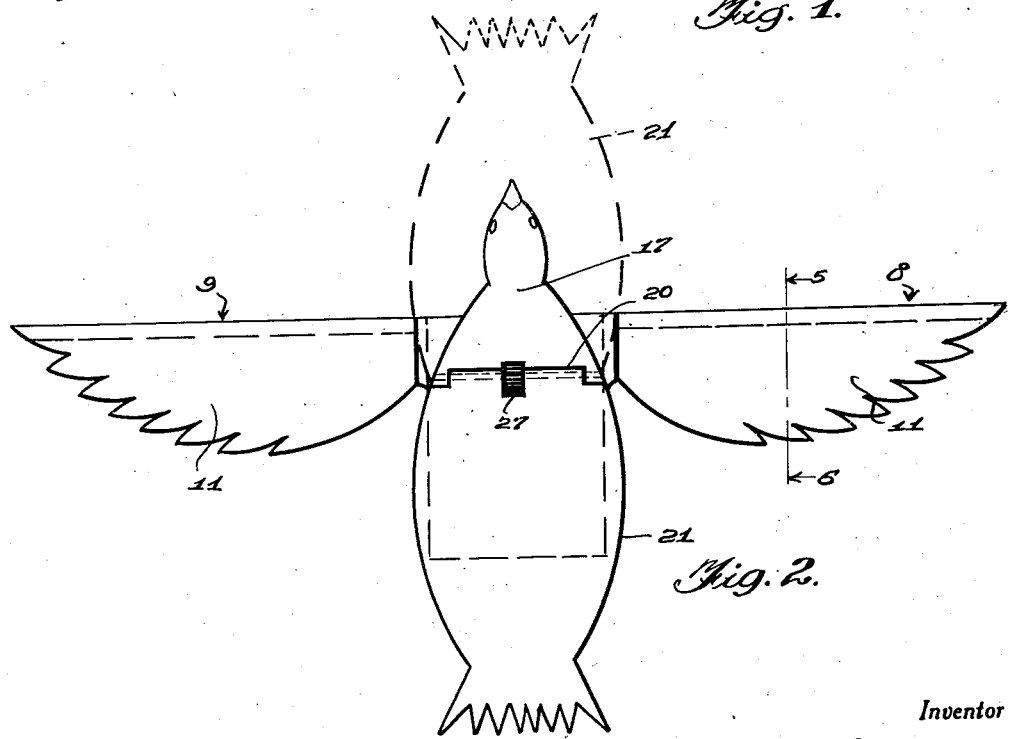
Figure 2 is a view in rear elevation of the signaling apparatus, proper, detached and with the right and left turn signaling members and other parts in normal position.
Figure 6:
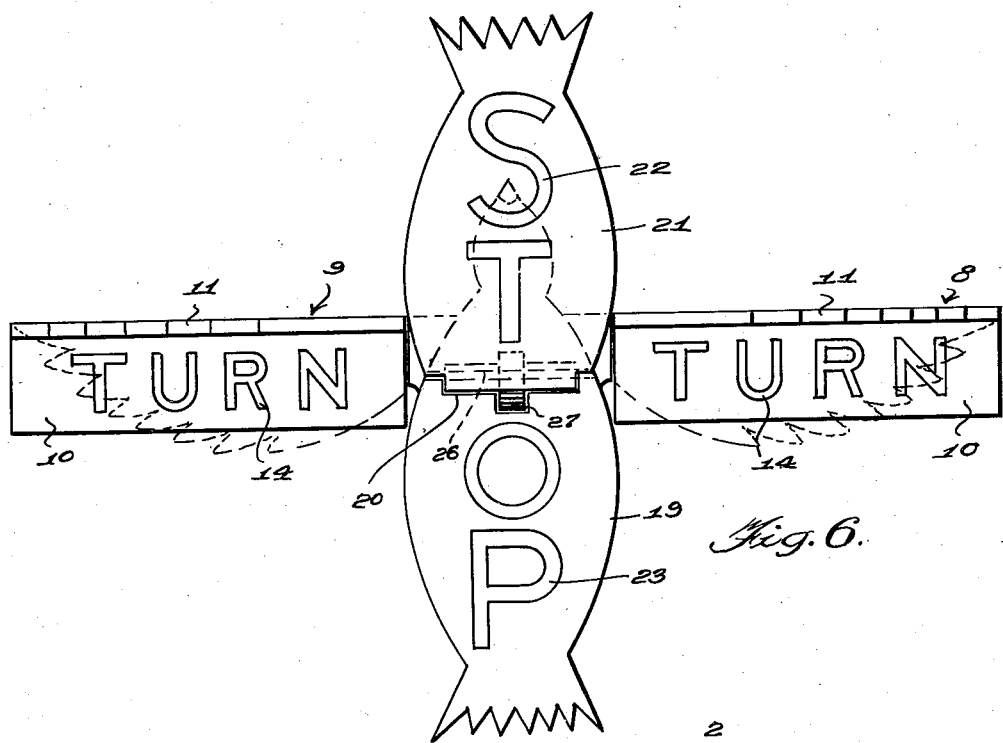
Figure 6 is a view similar to Figure 2 but illustrating the right and left turn signaling members rotated into signaling position and the stop signaling flap swung into signaling position.
Figure 7:
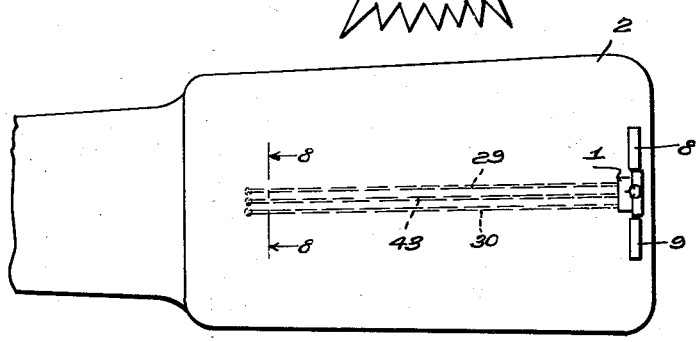
Figure 7 is a diagrammatic top plan view of the automobile body and my improved signaling apparatus.
Figure 8:
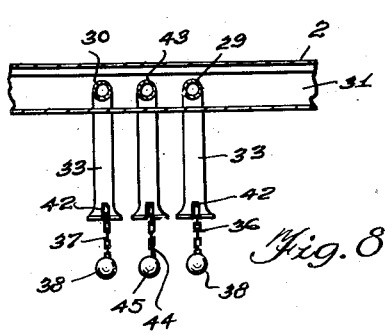
Figure 8 is a fragmentary view in transverse section taken on the line 8—8 of Figure 7 looking in the direction indicated by the arrows.

Referring to the drawings by numerals, the basic element of my invention is a control box I of substantially rectangular form, in cross section, adapted to be secured in any suitable manner to the rear end of an automobile body 2, preferably above the rear window of the latter, and having an open front shaped to conform at its edges to the curvature of the rear end of said body above said window 3. A pair of right and left turn signal operating shafts 4 and 5, respectively, are mounted horizontally in the control box I in end to end axial relation for independent rocking movement and with the outer ends thereof extending outwardly of the sides 6 of said box, said shafts being preferably disposed in the upper rear part of the box. For mounting the shafts 4, 5, the outer ends thereof are suitably journaled in the opposite sides 6 of the box I, and the inner ends thereof in a bearing bracket 7 provided in the vertical center of the box, as shown in Figure 3.

A pair of elongated right and left turn signaling members 8 and 9, respectively, extend lengthwise and horizontally from the outer ends of said shafts 4, 5, respectively, each of which comprises a rectangular signal displaying panel 10 and a right angularly related and coextensive edge flange 11. The members 8, 9 are detachably secured at one end to the outer ends of said shafts 4, 5, by means of apertured ears 12 on the members into which said ends of said shafts extend, and set screws 13 passing through said ears. As will be understood, the ears 12 are located on the members 8 and 9 at the juncture of the panels 10 and flanges 11 in between said panels and flanges. The panels 8, 9 bear the legends "Turn" as indicated at 14, delineated thereon in any suitable manner. Normally, the members 8, 9 are so positioned that the flanges 11 are vertically disposed and rearmost and the panels 10 horizontally disposed and uppermost, and the legends 14 are on the normally under face of the panels 10, whereby the flanges 11 are presented to the eye of a trailing driver and the legends 14 are hidden. Also, as will be manifest, if the shafts 4, 5 are given a quarter turn from normal position in the proper direction, i. e., clockwise, as viewed in Figure 4, the members 8, 9 will be rotated to reverse the described position of the flanges 11 and panels 10 so that said panels will be vertically disposed to display the legends 14 to trailing drivers and the flanges 11 will be horizontally disposed and presented edgewise to such drivers.

The back 15 of the control box I extends above the top 16 thereof, as at 17, and below the bottom 18 of said box, as at 19, and is of ornamental design, preferably having the form of the back of a bird such as a pigeon with the head uppermost. The flanges 11 have the form of wings, whereby when the members 8, 9 are in normal position with the flanges 11 vertical, said flanges together with the back 15 present a complete design of a pigeon in flight. These novel features serve to direct the attention of trailing drivers to the signaling device for reasons which will be understood.

Hinged, as at 20, in the horizontal center of the back 15 is a flap 21 normally pendant and overlying the lower half of said back 15, said flap being of the same shape and size as the lower part of the back and swingable from normal into upright position to thereby expose to view the rear face thereof and said lower half of the back. The legend "Stop" is delineated in part on the rear face of said flap, as at 22, and in part on the lower half of said back 15, as at 23, whereby when the flap is in normal position the legend is hidden and when said flap is swung into upstanding, or signaling, position, said legend 22, 23 is displayed to the rear.

In the back of the control box is a flap operating cross shaft 24 having the ends thereof suitably journaled in the sides 6 of said box 1 and a gear pinion 25 fixed centrally thereon. The hinge 20 of the flap 21 has the usual rotatably mounted pintle 26 to which the flap 21 is suitably secured at one end and which pintle has fast thereon a gear segment 27 extending through a slot 28 in the back 15 of the box 1 and into mesh with the gear pinion 25. By rotating the flap operating shaft 24, and hence the gear pinion 25, a half turn, in the proper direction, i. e., counter clockwise as viewed in Figure 4, said flap 21 will be swung from normal to signaling position.

For rotating the right and left turn signal operating shafts 4, 5 from normal position the following operating mechanism is provided.

A pair of right and left hand guide tubes 29 and 30 are suitable secured in the usual space 31 between the outer and inner walls of the automobile body 2, to extend forwardly from the control box 1 in laterally spaced relation, said tubes having flanged rear ends 32 extending through said outer wall and opening into the control box 1. The front ends 33 of the tubes 29, 30 are downturned and extend through the inner wall of the body 4 to terminate over the driver's head and within convenient reach of the driver's right hand. A pair of right and left pulleys 34, 35 are fixed upon the right and left turn signal operating shafts 4 and 5, respectively, adjacent to the side walls 6. A pair of right and left chains 36, 37 are operatively connected at one end to said pulleys 34, 35, respectively, and extended through said tubes 29 and 30 with the other ends thereof depending from the front ends 33 of said tubes and equipped with ball-like hand grips 38.

The right and left turn signal operating shafts 4, 5 are each yieldingly held in normal position by a coiled spring 39 sleeved thereon intermediate the bracket 7 and the pulley 34, or 35, as the case may be, one end of the spring being anchored to said bracket and the other end to a cotter pin 40 on the pulley normally bearing under reaction of the spring against a fixed stop 41 in the control box 1, whereby the normal position of the shaft is established. The chains 36, 37 are connected to their related pulleys 34, 35 so that under pull exerted thereon the requisite quarter turn will be imparted to the shafts 4, 5 and hence to the members 8 and 9.

As will now be seen, by pulling on the hand grip 38 of the appropriate chain 36, 37, the right and left turn signaling members 8, 9 may be rotated selectively from normal position to display the warning legends 14 on the panels 10, and upon release of the pulled chain the rotated member 8, or 9, will be returned to normal position by the related spring 39 to obliterate the warning legend. The front ends 33 of the tubes 29, 30 are each provided with a slot 42 therein for anchoring the related chain to said end and thereby preventing return of the member 8, or 9, to normal position, so that the driver may release his hold on a chain and set the member selected for display of the legend 14 as long as desired.

For rotating the flap operating shaft 24, a third guide tube 43 is provided in the space 31 intermediate the tubes 29, 30, said tube 43 being substantially identical in arrangement and structure with said tubes 29, 30. A pull chain 44 is extended through the tube 43 in the same manner as chains 36, 37 and provided at its front end with a hand grip ball 45. The rear end of the chain 44 is wound around and suitably anchored to a pulley 46 fast on the shaft 24 to rotate said shaft a half turn. The normal position of the shaft 24 is established by engagement of the flap 21 with the lower half of the back 15 of said box 1 as will be clear. A coil spring 47 on the shaft 24 having its ends anchored to said pulley 46 and to a boss 48 on the box 1 urges said shaft and the flap 21 into normal position.

Under pull on the hand grip 45 of chain 44 the shaft 24 will be rocked from normal position to swing the flap 21 into upright signaling position and thereby display the stop legends 22, 23 to view. Upon release of the hand grip 45 the spring 47 will return the shaft 24 and flap 21 to normal position in a manner which will be understood.

The foregoing will, it is believed, suffice to impart a clear understanding of my invention without further explanation.

Manifestly, the invention, as described, is susceptible of modification without departing from the inventive concept and right is herein reserved to such modifications as fall within the scope of the subjoined claims.

What I claim is:

1. The combination with the body of an automobile, of signalling apparatus comprising a control box secured to the rear end of said body, a pair of right and left elongated signalling members rotatably mounted on opposite sides of said box to extend lengthwise therefrom in horizontally aligned position, said members comprising, respectively, a signalling panel and a dummy panel extending at a right angle from one edge of the signalling panel, and said members being rotatable separately to position the respective panels in vertical position alternately and thereby adjust the same into signalling and non-signalling positions, respectively, and manipulative means to rotate said members comprising a pair of pull chains extending along the top of the automobile into said box and having free ends depending from said top over the driver's seat, and operating connections in said box between said chains and said members.

2. The combination with the body of an automobile, of signalling apparatus comprising a control box secured to the rear end of said body, a pair of right and left elongated signalling members rotatably mounted on opposite sides of said box to extend lengthwise therefrom in horizontally aligned position, said members comprising, respectively, a signalling panel and a dummy panel extending at a right angle from one edge of the signalling panel, said members being rotatable separately to position the respective panels in vertical position alternately and thereby adjust the same into signalling and non-signalling positions, respectively, and manipulative means to rotate said members comprising a pair of pull chains extending along the top of the automobile into said box and having free ends depending from said top over the driver's seat, and operating connections in said box between said chains and said members, comprising a pair of operating shafts for said members, respectively, a pair of pulleys fast on said shafts, respectively, to each of which one of said chains is connected, and spring means tensioning each shaft against operation.

ARTHUR W. GRAY.